United States Patent [19]
Shinohara

[11] Patent Number: 5,694,394
[45] Date of Patent: Dec. 2, 1997

[54] TRANSMISSION CHANNEL SELECTION SYSTEM USING DESTINATION ADDRESS

[75] Inventor: Takahiro Shinohara, Tokyo, Japan

[73] Assignee: NEC Corporation, Tokyo, Japan

[21] Appl. No.: 447,825

[22] Filed: May 23, 1995

[30] Foreign Application Priority Data

May 25, 1994 [JP] Japan .................................. 6-110752

[51] Int. Cl.⁶ ...................................................... H04J 3/02
[52] U.S. Cl. ........................ 370/401; 370/392; 370/402; 370/522
[58] Field of Search ......................... 370/85.13, 60, 370/94.1, 110.1, 92, 95.1, 422, 394, 522, 392, 401, 402, 403

[56] References Cited

U.S. PATENT DOCUMENTS

| | | | |
|---|---|---|---|
| 4,592,048 | 5/1986 | Beckner et al. | 370/110.1 |
| 5,166,971 | 11/1992 | Vollert | 370/110.1 |
| 5,206,933 | 4/1993 | Farrell et al. | 370/95.1 |
| 5,347,516 | 9/1994 | Yoshida | 370/94.1 |
| 5,432,792 | 7/1995 | Burkart et al. | 370/110.1 |
| 5,444,703 | 8/1995 | Gagliardi et al. | 370/85.13 |
| 5,450,412 | 9/1995 | Takebayashi et al. | 370/110.1 |

*Primary Examiner*—Douglas W. Olms
*Assistant Examiner*—Shick Hom
*Attorney, Agent, or Firm*—Scully, Scott, Murphy & Presser

[57] ABSTRACT

A transmission channel selection system which selects channels based upon the destination addresses of the data packets to be transmitted. The system includes a channel controller, a setting table, and a channel selection unit. The channel controller controls transmission of packet data corresponding to a plurality of transmission channels of an integrated service digital network (ISDN) line. The setting table sets a relationship between destination addresses of the packet data and the transmission channels of the ISDN line in advance. When packet data to be transmitted is input, the channel selection unit selects a transmission channel, of the ISDN line, corresponding to a destination address of the packet data with reference to the setting table. The packet data is transmitted to the ISDN line through the channel control means using the selected transmission channel.

7 Claims, 2 Drawing Sheets

TRANSMISSION CHANNEL SELECTION SYSTEM USING DESTINATION ADDRESS

BACKGROUND OF THE INVENTION

The present invention relates to a transmission channel selection system and, more particularly, to a transmission channel selection system which selects transmission channels based upon the destination addresses of the data packets to be transmitted. The selection system may be used in a communication system in which a plurality of LANs (Local Area Networks) are connected to each other through an ISDN (Integrated Service Digital Network) serving as a wide area network (WAN).

A communication system in which a plurality of LANs are connected to each other using an ISDN serving as a wide area network (WAN) service to transmit/receive packet data is known.

In such a system, a communication protocol in each LAN is terminated by a gateway, and the gateway recognizes the destination address of the received data packet. The protocol is converted into a protocol used in the ISDN, and the data packet is transmitted to an ISDN terminal adaptor. In this terminal adaptor, a connection request is transmitted to an ISDN line, and access to the ISDN is performed.

In this case, the ISDN terminal adaptor is set in advance such that only one of an ISDN circuit switching mode (B channel) and an ISDN packet switching mode (D channel) is used in accordance with an instruction from the gateway. At this time, when the circuit switching mode (B channel) is used, a method in which a line is not disconnected from the ISDN until no traffic is present on the line for a predetermined period of time is employed.

In such a data communication using LAN-WAN connection between terminals, when these traffics are transmitted to identical LANs those traffics passing on the ISDN use the channels (B or D channels) of the same service mode regardless of destination terminals on the LANs.

Therefore, when communications between terminals are present at predetermined intervals, any traffic is present on the line. For this reason, when the circuit switching mode (B channel) is used, the line is not disconnected from the ISDN by the traffic, and the line is kept connected to the ISDN. Therefore, line use efficiency is degraded.

When the packet switching mode (D channel) is used, a response speed is disadvantageously lower than that of the circuit switching mode (B channel).

SUMMARY OF THE INVENTION

It is an object of the present invention to provide a transmission channel selection system using a destination address and designed to effectively use an ISDN line serving as a WAN.

In order to achieve the above object, according to the present invention, there is provided a transmission channel selection system using a destination address, comprising channel control means for controlling transmission of packet data corresponding to a plurality of transmission channels of an integrated service digital network (ISDN) line, a setting table which sets a relationship between destination addresses of the packet data and the transmission channels of the ISDN line in advance, and channel selection means for, when packet data to be transmitted is input, selecting a transmission channel, of the ISDN line, corresponding to a destination address of the packet data with reference to the setting table, the packet data being transmitted to the ISDN line through the channel control means using the selected transmission channel.

DESCRIPTION OF THE PREFERRED EMBODIMENT

An embodiment of the present invention will be described below with reference to the accompanying drawings.

Figure 1:
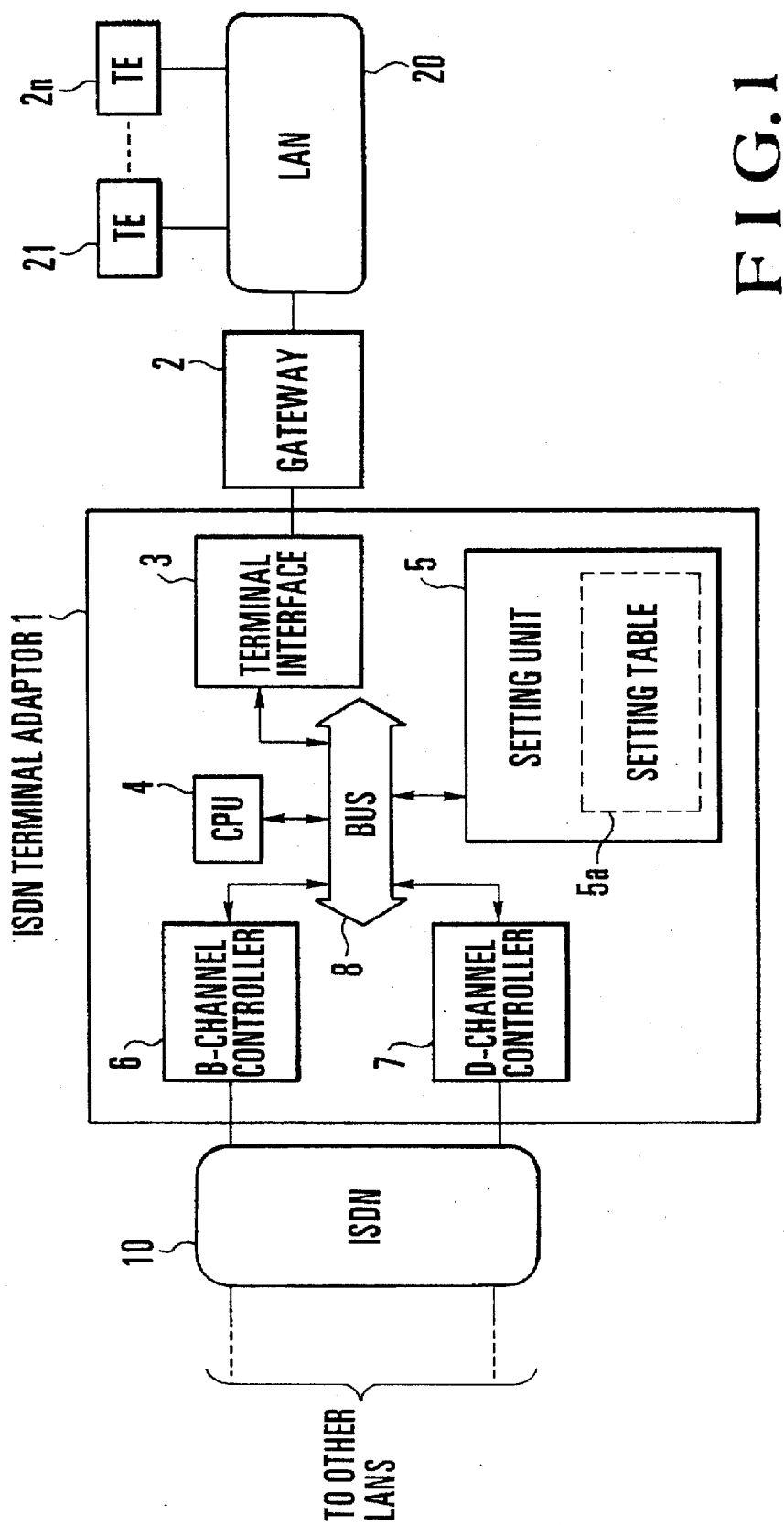
FIG. 1 is a block diagram showing a transmission channel selection system according to an embodiment of the present invention.

FIG. 1 shows a system according to the embodiment of the present invention. A plurality of terminals 21 to 2n such as computer servers are connected to a LAN 20. The LAN 20 is interconnected to other LANs (not shown) through an ISDN 10 serving as a wide area network (WAN).

In this case, a gateway 2 is arranged in this, system. The gateway 2 recognizes the destination address of a received packet by terminating a communication protocol in the LAN 20, converts the communication protocol into a protocol used in the ISDN 10 serving as a WAN, and transmits a line connection request to an ISDN terminal adaptor 1.

This ISDN terminal adaptor 1 accesses the ISDN 10 in accordance with the line connection request transmitted from the gateway 2. The ISDN terminal adaptor 1 comprises a terminal interface 3 which interfaces with the gateway 2, a CPU (Central Processing Unit) 4 serving as a controller, a setting unit 5 having a setting table 5a which sets the transmission mode of a packet for each destination address in advance, a B-channel controller 6 for controlling communication with the ISDN 10 in an ISDN line mode (B channel), a D-channel controller 7 for controlling communication with the ISDN 10 in an ISDN packet switching mode (D channel), and a bus 8. In the ISDN terminal adaptor 1, the CPU 4 extracts the destination address portion of a packet received from the gateway 2 through the terminal interface 3 and the bus 8 and interprets the destination address portion.

Figure 2:
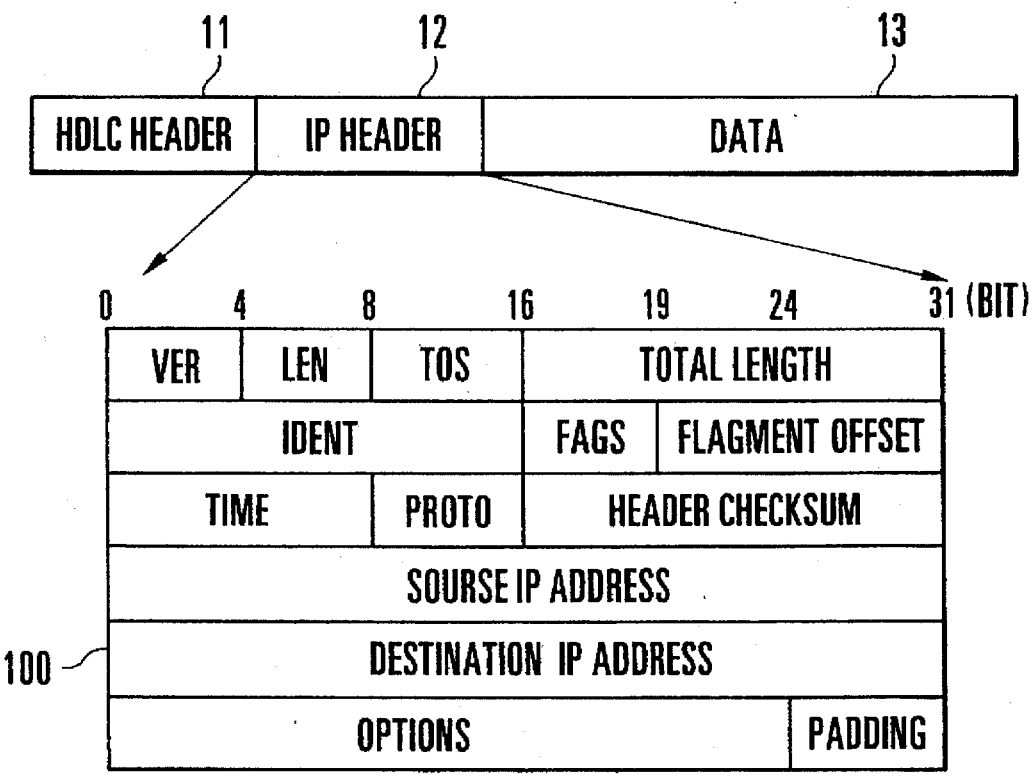
FIG. 2 illustrates the frame format and the IP header data format of a data packet which is used in the system illustrated in FIG. 1.

In this case, FIG. 2 shows an example of the frame format of the packet received from the gateway 2. FIG. 2 shows a format conforming to a TCP/IP (Transmission Control Protocol/Internet Protocol) which is a communication protocol developed and defined by the U.S. Department of Defence.

This frame packet is constituted by an HDLC header portion 11 for a line protocol, an IP header portion 12, and a data portion 13. The details of the IP header portion 12 are defined as shown in FIG. 2. Since a destination address information (DESTINATION IP ADDRESS) field 100 of the packet is present at a predetermined bit position in the IP header portion 12, the CPU 4 of the ISDN terminal adaptor 1 extracts this destination address information and determines an ISDN line channel (B or D channel) to which the destination address information is to be transmitted for each destination address defined by the setting unit 5 in advance.

Figure 3:
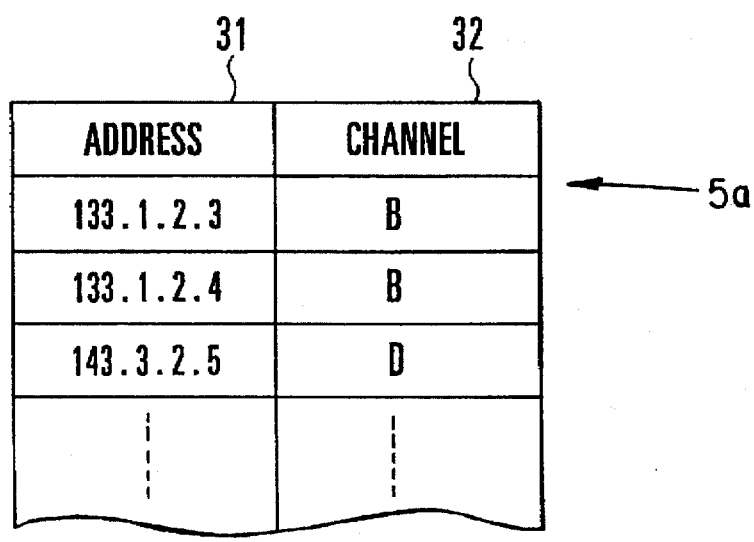
FIG. 3 is a table representing the relationship between destination addresses and transmission channels use.

FIG. 3 shows an example of the setting table 5a of the setting unit. The setting table 5a sets the relationship between destination addresses 31 and line channels 32. More specifically, the setting table 5a presets whether packets are transmitted for the respective destination addresses 31 through the B channel which uses a circuit switching mode or the D channel which uses a packet switching mode.

In recent ISDN service, in the circuit switching mode (B channel), a fee is charged on the basis of a connection time independently of a data amount on an actual line. In the packet switching mode (D channel), a fee is charged on the basis of a data amount independently of an actual use time.

Data communications between terminals are roughly classified into first and second types of communications. In the first type of communication, although an irregular communication is performed, a high-speed response (high-speed processing operation) is required. In the second type of communication, a high-speed response is not required, and file transfer is performed, or an information packet such as routing information related to a network, an interterminal polling packet, or an electronic mail is regularly transmitted.

In the first type of communication, the B channel which uses a circuit switching mode having a high-speed response is properly used. In the second type of communication, the D channel which uses a packet switching mode having a response speed lower than that of the circuit switching mode is properly used. When the second type of communication is to be performed, especially, when a communication of an information packet or a polling packet is to be regularly performed, data is regularly kept flowing in the circuit switching mode (B channel), although the data has a small amount. For this reason, a line is not disconnected from the ISDN. Therefore, the circuit switching mode is not properly used for the charging described above, and the packet switching mode (D channel) is properly used.

According to the present invention, communications are roughly classified into two types of communications, and the transmission channel of each communication is predetermined as the B or D channel in advance. Since the types of communications are often determined to some extent by computer servers serving as terminals, communications for destination addresses of transmission packets are roughly classified into two types of communications, and transmission channels are set for the destination addresses in advance.

When the CPU 4 of the ISDN terminal adaptor 1 recognizes, with reference to the table of the setting unit 5, that transmission of a current packet is to be performed using the B channel, the CPU 4 requests the ISDN 10 to connect the packet to the ISDN 10 through the B-channel controller 6, and the packet is transmitted to the ISDN 10.

When the CPU 4 recognizes that the D channel is to be used, the packet is transmitted to the ISDN 10 through the D-channel controller 7. At this time, after the packet is converted into an X.25 packet which can be transmitted in the packet switching mode, the packet is transmitted, as a matter of course.

As has been described above, according to the present invention, when a channel for a communication packet which is used between terminals, has a limited application, and does not require a high-speed response is different from a channel for a communication packet which requires a high-speed response and is used between terminals, a line can be effectively used.

What is claimed is:

1. A transmission channel selection system for selecting one of a plurality of transmission channels of an integrated services digital network ISDN line for transmitting a plurality of data packets each having a destination address, comprising:

channel control means for controlling the transmission of said data packets;

a setting table which is pre-configured to define a one to one relationship between the destination address of each said data packet and the transmission channels of said ISDN line; and channel selection means for, when one of said data packets to be transmitted is input, selecting one of said transmission channels of said ISDN line in response to the destination address of the input data packet and the pre-configured relationship defined in the setting table, said input data packet being transmitted to said ISDN line through said channel control means using the selected transmission channel.

2. The system according to claim 1, wherein the transmission channels of said ISDN line are B and D channels.

3. The system according to claim 2, wherein said channel control means comprises a B-channel controller for controlling transmission of the B channel and a D-channel controller for controlling transmission of the D channel, said channel selection means selects one of said B-channel controller and said D-channel controller in accordance with the selected transmission channel.

4. The system according to claim 2, wherein the setting table is pre-configured to logically relate the B channel to a first group of destination addresses corresponding to a data communication type which requires a high-speed processing operation, and the D channel is logically related to a second group of destination addresses corresponding to a data communication type which does not require a high-speed processing operation.

5. A transmission channel selection system comprising:

a local area network connected to an integrated service digital network ISDN line; and a terminal adaptor connected between said local area network and said ISDN line for selecting one of a plurality of transmission channels, including B and D channels, of said ISDN line in accordance with a destination address of a data packet received from said local area network, and using the selected transmission channel to control transmission of the data packet to said ISDN line.

6. The system according to claim 5, wherein said terminal adaptor comprises:

B-channel control means for controlling transmission of data packets using the B channel of said ISDN line;

D-channel control means for controlling transmission of data packets using the D channel of said ISDN line;

a setting table which is pre-configured to define a relationship between destination addresses of the data packets and the transmission channels of said ISDN line; and channel selection means for, when one of said data packets to be transmitted is input, reading out a stored transmission channel corresponding to the destination address of the input data packet as defined by the setting table, and selecting the B channel and the D channel corresponding to the read transmission channel, the input packet data being transmitted to said ISDN line through one of said B-channel control means and said D-channel control means.

7. The system according to claim 6, wherein the setting table is pre-configured to logically relate the B channel to a first group of destination addresses corresponding to a data communication type which requires a high-speed processing operation, and the D channel is logically related to a second group of destination addresses corresponding to a data communication type which does not require a high-speed processing operation.

* * * * *